(12) United States Patent
Park et al.

(10) Patent No.: US 12,519,095 B2
(45) Date of Patent: Jan. 6, 2026

(54) LITHIUM SECONDARY BATTERY INCLUDING NEGATIVE ELECTRODE HAVING IMPROVED RESISTANCE TO DEGRADATION, AND METHOD FOR MANUFACTURING SAME

(71) Applicant: SK On Co., Ltd., Seoul (KR)

(72) Inventors: Eunjun Park, Daejeon (KR); Joon Sup Kim, Daejeon (KR); Gwiok Park, Daejeon (KR); Jeehee Lee, Daejeon (KR)

(73) Assignee: SK On Co., Ltd., Seoul (KR)

( * ) Notice: Subject to any disclaimer, the term of this patent is extended or adjusted under 35 U.S.C. 154(b) by 1122 days.

(21) Appl. No.: 17/602,452

(22) PCT Filed: Apr. 1, 2020

(86) PCT No.: PCT/KR2020/004439
§ 371 (c)(1),
(2) Date: May 27, 2022

(87) PCT Pub. No.: WO2020/209540
PCT Pub. Date: Oct. 15, 2020

(65) Prior Publication Data
US 2022/0310985 A1    Sep. 29, 2022

(30) Foreign Application Priority Data

Apr. 10, 2019  (KR) .................. 10-2019-0041879
Mar. 31, 2020  (KR) .................. 10-2019-0039005

(51) Int. Cl.
*H01M 4/04*     (2006.01)
*H01M 4/02*     (2006.01)
(Continued)

(52) U.S. Cl.
CPC ......... *H01M 4/0404* (2013.01); *H01M 4/134* (2013.01); *H01M 4/1395* (2013.01); (Continued)

(58) Field of Classification Search
CPC .. H01M 4/0404; H01M 4/134; H01M 4/1395; H01M 10/0525; H01M 50/531; H01M 2004/027
See application file for complete search history.

(56) References Cited

U.S. PATENT DOCUMENTS

2011/0081570 A1   4/2011   Jang et al.
2013/0230765 A1   9/2013   Sawai et al.
(Continued)

FOREIGN PATENT DOCUMENTS

JP     2013181206 A    9/2013
KR   1020110036245 A   4/2011
(Continued)

OTHER PUBLICATIONS

Ahmadou Samba, Noshin Omar, Hamid Gualous, Odile Capron, Peter Van den Bossche, Joeri Van Mierlo, "Impact of Tab Location on Large Format Lithium-Ion Pouch Cell Based on Fully Coupled Tree-Dimensional Electrochemical-Thermal Modeling", 2014 Electrochemica Acta, vol. 147, pp. 319-321 (Year: 2014).*

*Primary Examiner* — Ula C Ruddock
*Assistant Examiner* — Sydney L Kline
(74) *Attorney, Agent, or Firm* — The Webb Law Firm

(57) ABSTRACT

The present invention relates to a lithium secondary battery having excellent lifespan characteristics by including a negative electrode improved in protection against degradation due to volume expansion of a negative electrode active material at the time of charging and discharging the lithium secondary battery, and a method of manufacturing the same.

17 Claims, 4 Drawing Sheets

(51) Int. Cl.
   *H01M 4/134*    (2010.01)
   *H01M 4/1395*   (2010.01)
   *H01M 4/38*     (2006.01)
   *H01M 10/0525*  (2010.01)
   *H01M 50/531*   (2021.01)

(52) U.S. Cl.
   CPC ....... *H01M 4/386* (2013.01); *H01M 10/0525* (2013.01); *H01M 50/531* (2021.01); *H01M 2004/027* (2013.01)

(56) References Cited

U.S. PATENT DOCUMENTS

2015/0318537 A1* 11/2015 Nishio .............. H01M 10/0525
                                                       429/223
2016/0036009 A1*  2/2016 Cho ................... B23K 26/244
                                                     219/121.72
2018/0277906 A1*  9/2018 Yoshima ............ H01M 50/249

FOREIGN PATENT DOCUMENTS

| KR | 1020160015013 A1 | 2/2016 | | |
| KR | 1020160039419 A | 4/2016 | | |
| KR | 2017034724 A | * 3/2017 | .......... | H01M 10/052 |
| KR | 1020170034724 A | 3/2017 | | |
| KR | 2017049136 A | * 5/2017 | ........... | H01M 10/04 |
| KR | 1020170049136 A | 5/2017 | | |
| KR | 1020170081907 A | 7/2017 | | |
| KR | 1020170111290 A | 10/2017 | | |
| KR | 1020170129514 A | 11/2017 | | |
| KR | 1020180058305 A | 6/2018 | | |

* cited by examiner

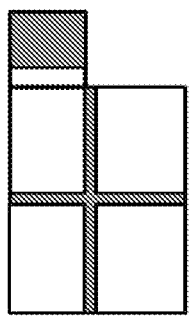 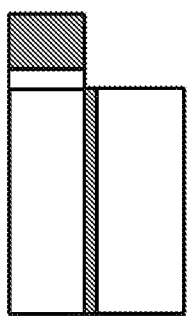 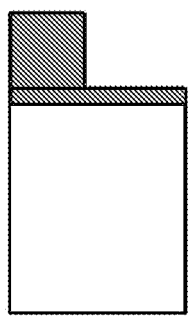 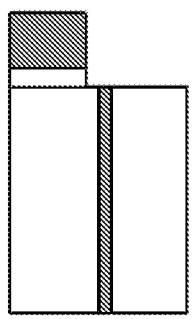 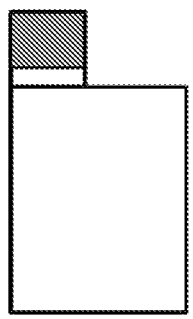
FIG. 1A    FIG. 1B    FIG. 1C    FIG. 1D    FIG. 1E
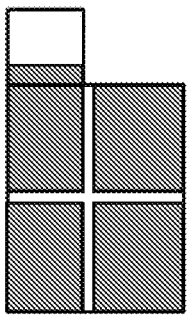 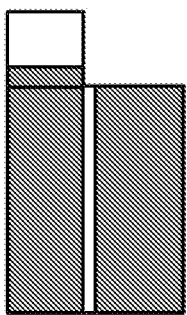 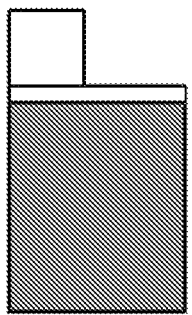 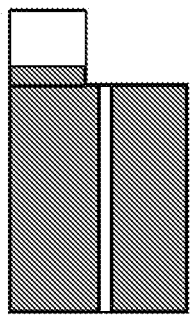 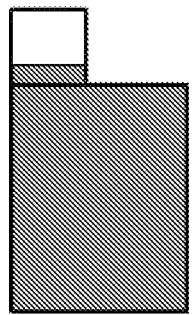
FIG. 2A    FIG. 2B    FIG. 2C    FIG. 2D    FIG. 2E

LITHIUM SECONDARY BATTERY INCLUDING NEGATIVE ELECTRODE HAVING IMPROVED RESISTANCE TO DEGRADATION, AND METHOD FOR MANUFACTURING SAME

CROSS-REFERENCE TO RELATED APPLICATIONS

This application is the United States national phase of International Application No. PCT/KR2020/004439 filed Apr. 1, 2020, and claims priority to Korean Patent Application Nos. 10-2019-0041879 filed Apr. 10, 2019 and 10-2020-0039005 filed Mar. 31, 2020, the disclosures of which are hereby incorporated by reference in their entirety.

BACKGROUND OF THE INVENTION

Field of the Invention

The following disclosure relates to a lithium secondary battery and a method of manufacturing the same.

Description of Related Art

Recently, in accordance with an increase in demand for electronic devices such as mobile devices, a demand for lithium secondary batteries such as lithium batteries, lithium ion batteries, and lithium ion polymer batteries as driving power supplies of these electronic devices has significantly increased. In addition, in accordance with the trend toward tightening of regulations on fuel efficiency and exhaust gas of vehicles all over the world, the growth of an electric vehicle market has accelerated, and accordingly, a demand for medium and large-sized secondary batteries such as secondary batteries for electric vehicles (EVs) and secondary batteries for energy storage systems (ESS) has been expected to rapidly increase.

The development of technologies for the secondary batteries has continuously increased. In particular, silicon-based negative electrodes have become significantly prominent as negative electrodes of lithium secondary batteries to be used in next-generation mobile devices, EVs, and ESSs due to its theoretical capacity (3580 mAh/g) several times greater than a capacity (372 mAh/g) of graphite.

However, a silicon-based negative electrode active material is accompanied by a serious volume change (~400%) at the time of reacting with lithium, that is, at the time of charging and discharging the lithium secondary battery, which may cause deintercalation between the silicon-based negative electrode active material and a current collector or the negative electrode active materials. This may cause a loss of a reversible capacity of the lithium secondary battery in a long charge/discharge cycle, thereby significantly degrading performance of the lithium secondary battery, such as lifespan characteristics. In addition, a degree of a volume change should be considered at the time of designing a cell due to volume expansion, and thus, an energy density per unit volume may be significantly decreased. Therefore, due to these problems, it is difficult to put a lithium secondary battery including the silicon-based negative electrode to practical use even though the lithium secondary battery including the silicon-based negative electrode has an advantage such as a high capacity.

In order to solve the problems described above, several technologies such as a composition change (SiOx or SiO) of silicon, a structure change (porous, one-dimensional or two-dimensional, or core-shell) of silicon, and a combination (Si/C or SiO/C) of silicon with other materials with less volume expansion or a porous property as compared with silicon have been attempted. However, such technologies still have a problem that degradation of performance of the lithium secondary battery due to degradation of the negative electrode occurs at the time of charging and discharging the lithium secondary battery. In addition, this is a limitation in implementing a lithium secondary battery having a high capacity.

Therefore, it is necessary to develop a lithium secondary battery having a high capacity and excellent lifespan characteristics by improving protection against degradation of performance due to volume expansion of a silicon-based negative electrode active material at the time of charging and discharging the lithium secondary battery while using a negative electrode containing a high content of the silicon-based negative electrode active material.

SUMMARY OF THE INVENTION

Technical Problem

An embodiment of the present invention is directed to providing a lithium secondary battery having a high capacity and excellent lifespan characteristics by including a negative electrode improved in protection against degradation due to volume expansion of a silicon-based negative electrode active material at the time of charging and discharging the lithium secondary battery while containing a high content of the silicon-based negative electrode active material.

Another embodiment of the present invention is directed to providing a method of manufacturing a lithium secondary battery having a high capacity and excellent lifespan characteristics by including a negative electrode improved in protection against degradation due to volume expansion of a silicon-based negative electrode active material at the time of charging and discharging the lithium secondary battery while containing a high content of the silicon-based negative electrode active material, by a simpler process.

Technical Solution

In one general aspect, a lithium secondary battery includes: a negative electrode including a negative electrode current collector portion and a negative electrode tab portion protruding from a part of one surface of the negative electrode current collector portion,
  wherein the negative electrode current collector portion includes a coated portion that is coated with a negative electrode active material and an uncoated portion that is not coated with the negative electrode active material, and
  when the negative electrode is viewed from above, the uncoated portion is positioned at a point adjacent to an extension line of a boundary line between the negative electrode current collector portion and the negative electrode tab portion.

The uncoated portion may have any one shape selected from one or more longitudinal lines having a width, one or more transverse lines having a width, and combinations thereof.

The uncoated portion may be positioned at a point adjacent to at least one end point of the boundary line between the negative electrode current collector portion and the negative electrode tab portion.

The uncoated portion may include one or more longitudinal lines starting from at least one end point of the boundary line between the negative electrode current collector portion and the negative electrode tab portion and having a width.

The uncoated portion may further include one or more transverse lines starting from a side of the negative electrode current collector portion on which the negative electrode tab portion does not protrude and having a width.

The transverse line may start from a point of 30% or more and 70% or less of a total length of the side of the negative electrode current collector portion on which the negative electrode tab portion does not protrude.

The width of the longitudinal line may be 0.1 to 10% of a total horizontal length of the negative electrode current collector portion, and the width of the transverse line may be 0.1 to 10% of a total vertical length of the negative electrode current collector portion.

The width of the longitudinal line may be 0.2 mm or more and be 10% or less of a total horizontal length of the negative electrode current collector portion, and the width of the transverse line may be 0.2 mm or more and be 10% or less of a total vertical length of the negative electrode current collector portion.

The negative electrode tab portion may protrude from a leftmost side or a rightmost side of one surface of the negative electrode current collector portion.

A content of silicon in the negative electrode active material may be 5 wt % or more with respect to 100 wt % of the total negative electrode active material.

In another general aspect, a method of manufacturing a lithium secondary battery includes: preparing a negative electrode including a negative electrode current collector portion partially coated with a negative electrode active material and a negative electrode tab portion protruding from a part of one surface of the negative electrode current collector portion, wherein the preparing of the negative electrode includes:
masking a point adjacent to an extension line of a boundary line between the negative electrode current collector portion and the negative electrode tab portion when the negative electrode is viewed from above;
coating and drying a negative electrode active material slurry on the negative electrode current collector portion; and
removing the masking.

The negative electrode tab portion may protrude from a leftmost side or a rightmost side of one surface of the negative electrode current collector portion.

In the masking, the point may be masked in any one shape selected from one or more longitudinal lines having a width, one or more transverse lines having a width, and combinations thereof.

In the masking, a point adjacent to at least one end point of the boundary line between the negative electrode current collector portion and the negative electrode tab portion may be masked.

In the masking, the point may be masked in a shape of one or more longitudinal lines starting from at least one end point of the boundary line between the negative electrode current collector portion and the negative electrode tab portion and having a width.

In the masking, the point may be further masked in a shape of one or more transverse lines starting from a side of the negative electrode current collector portion on which the negative electrode tab portion does not protrude and having a width.

The transverse line may be masked to be positioned at a point of 30% or more and 70% or less of a total length of the side of the negative electrode current collector portion on which the negative electrode tab portion does not protrude.

In the masking, the width of the longitudinal line may be 0.1 to 10% of a total horizontal length of the negative electrode current collector portion, and the width of the transverse line may be 0.1 to 10% of a total vertical length of the negative electrode current collector portion.

In the masking, the width of the longitudinal line may be 0.2 mm or more and be 10% or less of a total horizontal length of the negative electrode current collector portion, and the width of the transverse line may be 0.2 mm or more and be 10% or less of a total vertical length of the negative electrode current collector portion.

In the masking, the point may be masked using a heat-shrinkable tape.

In the coating and drying of the negative electrode active material slurry, a content of silicon with respect to 100 wt % of the total negative electrode active material in the negative electrode active material slurry may be 5 wt %.

Advantageous Effects

The lithium secondary battery according to the present invention may implement a high capacity and excellent lifespan characteristics by including a negative electrode improved in protection against degradation due to volume expansion of a silicon-based negative electrode active material at the time of charging and discharging the lithium secondary battery while containing a high content of the silicon-based negative electrode active material.

In addition, with the method of manufacturing a lithium secondary battery according to the present invention, the lithium secondary battery having the advantage described above may be manufactured by a simpler process.

BRIEF DESCRIPTION OF THE DRAWINGS

FIGS. 1A to 1E are views illustrating shapes of taped copper thin films according to Examples 1 to 4 and Comparative Example 1.

FIGS. 2A to 2E are views illustrating shapes of copper thin films coated with negative electrode active materials according to Examples 1 to 4 and Comparative Example 1.

DESCRIPTION OF THE INVENTION

Figure 3:
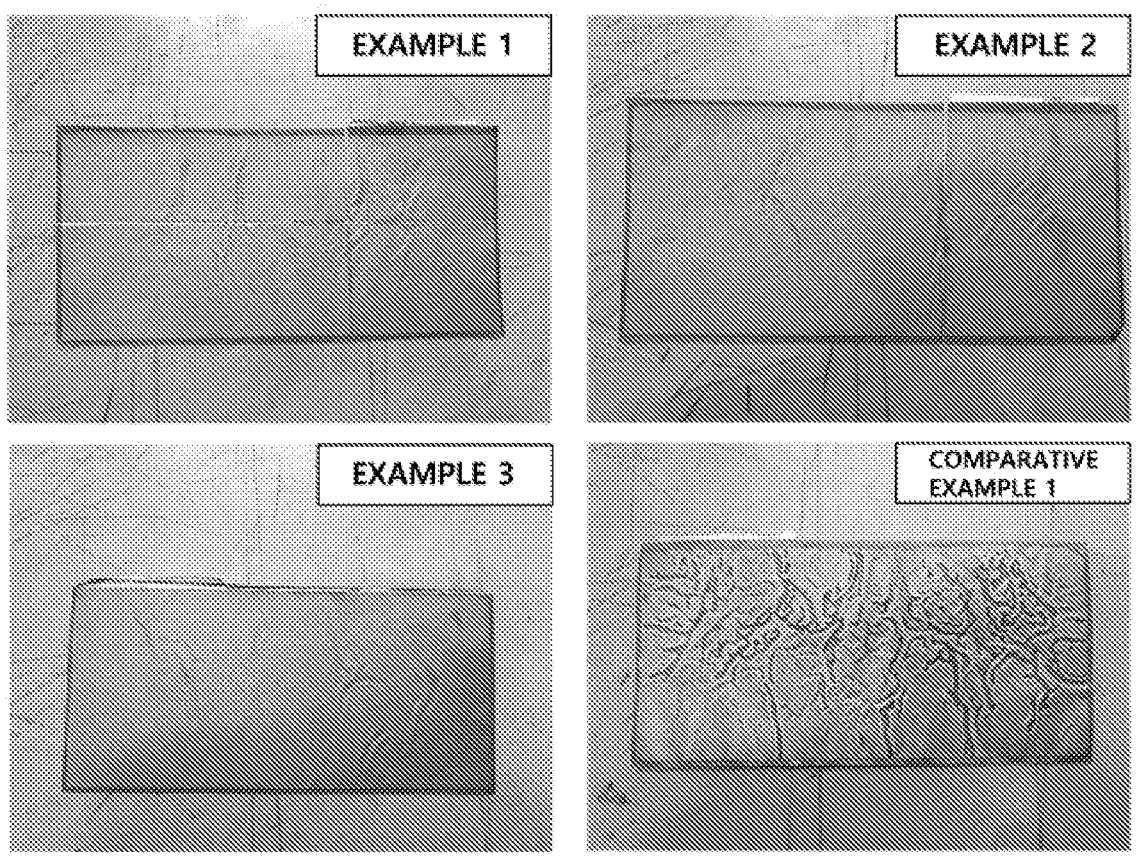
FIG. 3 are photographs taken in order to evaluate degrees of degradation of negative electrodes according to Examples 1 to 3 and Comparative Example 1.

Hereinafter, the present invention will be described in detail.

Unless defined otherwise, all terms (including technical and scientific terms) used in the present specification have the same meaning as meanings commonly understood by those skilled in the art to which the present invention pertains. Throughout the present specification, unless described to the contrary, "including" any component will be understood to imply the inclusion of other elements rather than the exclusion of other elements. In addition, a singular form includes a plural form unless specially described in the text.

In the present specification, the term "point adjacent" to an extension line or an end point may refer to a "point in contact" with the extension line or the end point.

In the present specification, a "longitudinal direction" and "vertical" may refer to a direction in which a negative electrode tab portion protrudes from one surface of a negative electrode current collector portion, and a "transverse direction" and "horizontal" may refer to a direction perpendicular to the direction described above.

In the present specification, a phrase "when viewing a negative electrode from above" may mean vertically looking down the greatest area of the negative electrode. For example, "when viewing the negative electrode from above", the negative electrode may look like FIGS. 2A to 2E.

The present invention relates to a lithium secondary battery having a high capacity and excellent lifespan characteristics by including a negative electrode improved in protection against degradation due to volume expansion of a silicon-based negative electrode active material at the time of charging and discharging the lithium secondary battery while containing a high content of the silicon-based negative electrode active material, and a method for manufacturing the same.

Specifically, the present invention relates to a lithium secondary battery including: a negative electrode including a negative electrode current collector portion and a negative electrode tab portion protruding from a part of one surface of the negative electrode current collector portion, wherein the negative electrode current collector portion includes a coated portion that is coated with a negative electrode active material and an uncoated portion that is not coated with the negative electrode active material, and when the negative electrode is viewed from above, the uncoated portion is positioned at a point adjacent to an extension line of a boundary line between the negative electrode current collector portion and the negative electrode tab portion.

In a case where a negative electrode of a conventional lithium secondary battery contains a high-capacity negative electrode active material (for example, a silicon-based negative electrode active material) in a high content, degradation of the negative electrode such as denting, a tearing, and deintercalation of the negative electrode active material has occurred due to volume expansion of the negative electrode active material at the time of charging and discharging the lithium secondary battery. This not only sharply degraded performance (e.g., lifespan characteristics) of the lithium secondary battery, but also was a technical obstacle in implementing a lithium secondary battery having a high capacity.

The negative electrode according to the present invention includes the uncoated portion that is not coated with the negative electrode active material, such that stress due to volume expansion of the negative electrode active material at the time of charging and discharging the lithium secondary battery may be alleviated. Therefore, degradation of the negative electrode may be prevented, and the lithium secondary battery may show excellent lifespan characteristics.

In addition, the negative electrode according to the present invention may contain the negative electrode active material (e.g., the silicon-based negative electrode active material) having a capacity higher than that of a conventional negative electrode in a high content. Therefore, a lithium secondary battery having high capacity characteristics may be implemented.

In particular, the uncoated portion may be positioned at a point where the stress due to the volume expansion of the negative electrode active material is concentrated, that is, a point adjacent to the extension line of the boundary line between the negative electrode current collector portion and the negative electrode tab portion to effectively alleviate the expansion stress. Therefore, the effect as described above may be further enhanced.

In addition, the uncoated portion is formed at the above-described position, such that an area of the uncoated portion for alleviating the expansion stress may be decreased. Therefore, a decrease in capacities of the negative electrode and the lithium secondary battery due to the uncoated portion greater than necessary may be prevented. That is, in a case where the area of the uncoated portion is greater than necessary, the capacities of the negative electrode and the lithium secondary battery may be decreased, which may be effectively prevented in the present invention.

In the present invention, a shape of the uncoated portion is not particularly limited as long as an object of the present invention is achieved. Therefore, those skilled in the art may appropriately select the shape of the uncoated portion so that the stress due to the expansion of the negative electrode active material may be alleviated.

However, in an embodiment of the present invention, the uncoated portion may have any one shape selected from one or more longitudinal lines having a width, one or more transverse lines having a width, and combinations thereof. In this case, the expansion stress due to the volume expansion of the negative electrode active material may be delocalized in a wide range, and thus, effective relaxation of the expansion stress and improvement of protection against the degradation of the negative electrode may be implemented.

In this case, types of the longitudinal line and the transverse line are not limited thereto. In addition, the longitudinal line and the transverse line do not necessarily be the same type of line. Therefore, types of lines may be independently selected from several commonly known lines such as solid lines, dotted lines, broken lines, and long broken lines. However, it may be preferred that the lines are solid lines.

In an embodiment of the present invention, the width of the longitudinal line may be 0.1 to 10%, preferably 0.25 to 5%, and more preferably 0.5 to 3% of a total horizontal length of the negative electrode current collector portion. In addition, the width of the transverse line may be 0.1 to 10%, preferably 0.25 to 5%, and more preferably 0.5 to 3% of a total vertical length of the negative electrode current collector portion. In this case, the stress due to the volume expansion of the negative electrode active material may be effectively alleviated, and an area of the coating portion coated with the negative electrode active material may be secured at a high level. Therefore, the negative electrode and the lithium secondary battery according to the present invention may implement higher capacity characteristics. In addition, in a case where the width of the longitudinal line or the transverse line is greater than necessary, the capacities of the negative electrode and the lithium secondary battery may be decreased due to an increase in the area of the uncoated portion, which may be effectively prevented in a case where the longitudinal line and the transverse line have the widths as described above.

In some embodiments, the widths of the longitudinal line and the transverse line may be independently 0.2 mm or more, preferably 0.5 mm or more, and more preferably 2 mm or more. For example, the width of the longitudinal line may be 0.2 mm or more and be 10% or less of the total horizontal length of the negative electrode current collector portion. Similarly, the width of the transverse line may be 0.2 mm or more and be 10% or less of the total vertical length of the negative electrode current collector portion.

In a case where the width of the longitudinal line or the transverse line is less than 0.2 mm, the area of the uncoated portion capable of alleviating the stress due to the volume expansion of the negative electrode active material becomes insufficient. Therefore, the improvement of the lifespan characteristics of the lithium secondary battery may be insufficient. In addition, as described later, in a case where the uncoated portion is introduced using a tape or the like, it may be difficult to remove the tape and the negative electrode active material.

In addition, in a case where the width of the longitudinal line exceeds 10% of the total horizontal length of the negative electrode current collector portion or in a case where the width of the transverse line exceeds 10% of the total vertical length of the negative electrode current collector portion, an energy density per volume of the negative electrode is decreased, and at the same time, an unreacted portion of a positive electrode is increased, such that an energy density of the lithium secondary battery may be decreased. Therefore, in such a case, it may be reasonable to employ a negative electrode active material of which a capacity is low or volume expansion is small, for example, a graphite-based negative electrode active material without the uncoated portion as in the conventional art.

In an embodiment of the present invention, the uncoated portion may be positioned at a point adjacent to at least one end point of the boundary line between the negative electrode current collector portion and the negative electrode tab portion. In this case, the uncoated portion is formed at a position adjacent to the point where the stress due to the volume expansion of the negative electrode active material is most concentrated, such as the expansion stress may be significantly alleviated. In addition, the protection against the degradation of the negative electrode may be improved, and thus, the lithium secondary battery according to the present invention may show the excellent lifespan characteristics.

In some embodiments, the uncoated portion may include one or more longitudinal lines starting from at least one end point of the boundary line between the negative electrode current collector portion and the negative electrode tab portion and having a width. In this case, the expansion stress may be delocalized in a wide range, and thus, the effect as described above may be further enhanced.

In addition, in some embodiments, the uncoated portion may further include one or more transverse lines starting from a side of the negative electrode current collector portion on which the negative electrode tab portion does not protrude and having a width. In this case, both the expansion stress acting in the transverse direction and the expansion stress acting in the longitudinal direction may be delocalized in a wide range. Therefore, the expansion stress may be significantly alleviated, and thus, the effect described above may be particularly further enhanced.

In some embodiments, the transverse line may start from a point of 30% or more and 70% or less of a total length of the side. In this case, the expansion stress concentrated on the end point and the expansion stress applied to the entirety of the negative electrode current collector portion may be generally alleviated, and thus, the effect described above may be particularly further enhanced.

In this case, types of the longitudinal line and the transverse line are not particularly limited as long as an object of the present invention is achieved, and may be independently selected from several types of commonly known lines such as solid lines, dotted lines, broken lines, and long broken lines.

In some embodiments, the width of the longitudinal line may be 0.1 to 10%, preferably 0.25 to 5%, and more preferably 0.5 to 3% of a total horizontal length of the negative electrode current collector portion. In addition, the width of the transverse line may be 0.1 to 10%, preferably 0.25 to 5%, and more preferably 0.5 to 3% of a total vertical length of the negative electrode current collector portion.

In some embodiments, the widths of the longitudinal line and the transverse line may be independently 0.2 mm or more, preferably 0.5 mm or more, and more preferably 2 mm or more. For example, the width of the longitudinal line may be 0.2 mm or more and be 10% or less of the total horizontal length of the negative electrode current collector portion. Similarly, the width of the transverse line may be 0.2 mm or more and be 10% or less of the total vertical length of the negative electrode current collector portion.

In an embodiment of the present invention, a position of the negative electrode tab portion is not particularly limited as long as the negative electrode tab portion protrudes from a part of one surface of the negative electrode current collector portion.

However, in some embodiments, the negative electrode tab portion may protrude from the leftmost side or the rightmost side of one surface of the negative electrode current collector portion. In this case, one of both end points of the boundary line between the negative electrode current collector portion and the negative electrode tab portion where the stress due to the volume expansion of the negative electrode active material is particularly concentrated may be formed at an edge of the negative electrode. Therefore, protection against degradation of the negative electrode due to expansion stress and degradation of performance of the lithium secondary battery may be further improved. In addition, the area of the uncoated portion may be further decreased, such that the lithium secondary battery may implement high capacity characteristics.

In an embodiment of the present invention, a content of silicon in the negative electrode active material may be 2.5 wt % or more, preferably 5 wt % or more, and more preferably 10 wt % or more with respect to 100 wt % of the total negative electrode active material. In this case, an object of the present invention, which is to provide a lithium secondary battery having a high capacity, may be achieved.

In addition, the present invention provides a method of manufacturing a lithium secondary battery including: preparing a negative electrode including a negative electrode current collector portion partially coated with a negative electrode active material and a negative electrode tab portion protruding from a part of one surface of the negative electrode current collector portion, wherein the preparing of the negative electrode includes:
masking a point adjacent to an extension line of a boundary line between the negative electrode current collector portion and the negative electrode tab portion when the negative electrode is viewed from above;
coating and drying a negative electrode active material slurry on the negative electrode current collector portion; and removing the masking.

In a case of the method of manufacturing a lithium secondary battery according to the present invention, a lithium secondary battery including a negative electrode improved in protection against degradation and having excellent lifespan characteristics at the time of charging and discharging the lithium battery may be manufactured by a simpler process.

In this case, a method of manufacturing a lithium secondary battery known in the art may be employed except for the preparing of the negative electrode.

In the method of manufacturing a lithium secondary battery according to the present invention, the masking, the coating and drying of the negative electrode active material slurry, and the removing of the masking are to form a portion that is not coated, that is, an uncoated portion, on a part of the negative electrode current collector portion.

However, this corresponds to an example of a method of simply forming the uncoated portion, and a method of forming the uncoated portion is not necessarily limited thereto, and any patterning technology that may be applied to the electrode may be adopted and applied.

Similarly, in the masking, a masking method is not particularly limited. That is, any method that may cover and block a part of the negative electrode current collector portion at the time of coating the negative electrode active material slurry on the negative electrode current collector portion may be adopted and applied.

For example, a masking method using a tape, a masking method using an adhesive film, or the like, may be adopted as the masking method. In this case, as the tape and the adhesive film, a tape and an adhesive film that may be removed without affecting a surface of the negative electrode current collector portion may be more preferred.

In an embodiment of the present invention, the tape may be a heat-shrinkable tape, for example, a tape having a plastic backing that may be shrunk and deformed by heat.

As a specific example, the tape may be a tape having at least one plastic backing selected from polyolefin, biaxial polyvinyl fluoride, polyester, polyvinyl chloride, and the like. In this case, the tape may be desorbed and removed more easily in a drying process. Therefore, the process may be more simplified and economical.

Hereinafter, the method of manufacturing a lithium secondary battery according to the present invention will be described in detail. However, some of the above-described contents may be omitted.

In an embodiment of the present invention, as a material of the negative electrode current collector portion, one or more selected from copper foil, nickel foil, stainless steel foil, titanium foil, nickel foam, copper foam, a polymer substrate coated with a conductive metal, and the like may be used.

In some embodiments, the negative electrode tab portion may be formed of the same material as the negative electrode current collector portion or may be formed of a different material from the negative electrode current collector portion.

A position of the negative electrode tab portion is not particularly limited as long as the negative electrode tap portion protrudes from a part of one surface of the negative electrode current collector portion.

However, in some embodiments, the negative electrode tab portion may protrude from the leftmost side or the rightmost side of one surface of the negative electrode current collector portion. In this case, one of both end points of the boundary line between the negative electrode current collector portion and the negative electrode tab portion where the expansion stress of the negative electrode active material is particularly concentrated may be formed at an edge of the negative electrode. Therefore, in the masking, an area to be masked to form the uncoated portion may be decreased. Therefore, the subsequent process may be more simplified and economical. In addition, the manufactured negative electrode may be further improved in protection against degradation due to the expansion stress, and the lithium secondary battery may show high capacity characteristics due to the decreased area of the uncoated portion.

In the masking according to the present invention, a shape to be masked is not particularly limited. Therefore, those skilled in the art may appropriately select the shape to be masked within the range in which an object of the present invention is achieved.

However, in an embodiment of the present invention, in the masking, the point may be masked any one shape selected from one or more longitudinal lines having a width, one or more transverse lines having a width, and combinations thereof.

In addition, in an embodiment of the present invention, in the masking, a point adjacent to at least one end point of the boundary line between the negative electrode current collector portion and the negative electrode tab portion may be masked.

In some embodiments, the point may be masked in a shape of one or more longitudinal lines starting from at least one end point of the boundary line between the negative electrode current collector portion and the negative electrode tab portion and having a width.

In some embodiments, the point may be further masked in a shape of one or more transverse lines starting from a side of the negative electrode current collector portion on which the negative electrode tab portion does not protrude and having a width.

In some embodiments, the transverse line may be masked to be positioned at a point of 30% or more and 70% or less of a total length of the side of the negative electrode current collector portion on which the negative electrode tab portion does not protrude.

In the case as described above, the negative electrode improved particularly in the protection against the degradation due to the effective alleviation of the expansion stress may be manufactured through a simpler process.

In an embodiment of the present invention, in the masking, the width of the longitudinal line may be 0.1 to 10%, preferably 0.25 to 5%, and more preferably 0.5 to 3% of a total horizontal length of the negative electrode current collector portion, and the width of the transverse line may be 0.1 to 10%, preferably 0.25 to 5%, and more preferably 0.5 to 3% of a total vertical length of the negative electrode current collector portion.

In some embodiments, the widths of the longitudinal line and the transverse line may be independently 0.2 mm or more, preferably 0.5 mm or more, and more preferably 2 mm or more. For example, the width of the longitudinal line may be 0.2 mm or more and be 10% or less of the total horizontal length of the negative electrode current collector portion. Similarly, the width of the transverse line may be 0.2 mm or more and be 10% or less of the total vertical length of the negative electrode current collector portion.

In an embodiment of the present invention, in the masking, a tape or an adhesive film may be used.

In some embodiments, a width of the tape or the adhesive film masking the longitudinal line may be 0.1 to 10%, preferably 0.25 to 5%, and more preferably 0.5 to 3% of a total horizontal length of the negative electrode current collector portion. In addition, a width of the tape or the adhesive film masking the transverse line may be 0.1 to 10%, preferably 0.25 to 5%, and more preferably 0.5 to 3% of a total vertical length of the negative electrode current collector portion. In this case, shapes of the longitudinal line and the transverse line having the width as described above may be simply formed without performing an excessive repetition process, such that a manufacturing process may be further simplified.

In some embodiments, the widths of the tape or the adhesive film may be 0.2 mm or more, preferably 0.5 mm or more, and more preferably 2 mm or more. In this case, the tape or adhesive film and the negative electrode active material may be easily removed. In addition, a decrease in effect of improving the protection against the degradation of the negative electrode due to an excessively small area of the uncoated portion may be prevented. As a more specific example, the width of the tape or the adhesive film masking the longitudinal line may be 0.2 mm or more and be 10% or less of the total horizontal length of the negative electrode current collector portion. Similarly, the width of the tape or the adhesive film masking the transverse line may be 0.2 mm or more and be 10% or less of the total vertical length of the negative electrode current collector portion.

In some embodiments, a thickness of the tape or the adhesive film masking the longitudinal line and the transverse line may be independently 30 μm or more and be smaller than or equal to a total thickness of the negative electrode. For example, the thickness of the tape or the adhesive film masking the longitudinal line and the transverse line may be 30 μm or more, and may not exceed a total thickness of the negative electrode current collector portion after pressing the negative electrode current collector portion that may be performed after the coating and drying of the negative electrode active material slurry. When the thickness of the tape or the adhesive film is less than 30 μm, there is a risk that the tape or the adhesive film will be broken or the negative electrode will be damaged in the removing of the masking. In addition, when the thickness of the tape or the adhesive film exceeds the total thickness of the negative electrode current collector portion after the pressing of the negative electrode current collector portion, it is difficult to mold the negative electrode at a thickness in a design due to the thickness of the tape or the adhesive film in the pressing of the negative electrode current collector portion, such that a problem that an energy density of the lithium secondary battery is different from a design value may occur.

In an embodiment of the method of manufacturing a lithium secondary battery according to the present invention, the coating and drying of the negative electrode active material slurry may be performed by coating and drying the negative electrode active material slurry to the negative electrode current collector portion to forming a negative electrode active material layer on the negative electrode current collector portion.

In addition, in an embodiment of the present invention, the method of manufacturing a lithium secondary battery may further include, after coating and drying the negative electrode active material slurry, pressing the negative electrode current collector portion. The pressing of the negative electrode current collector portion may be performed before the removing of the masking, be performed after the removing of the masking, or be performed both before and after the removing of the masking.

In an embodiment of the present invention, the negative electrode active material slurry may be prepared by mixing and stirring a solvent and, if necessary, a binder and a conductive material with a negative electrode active material.

As the negative electrode active material, a compound capable of reversible intercalation and deintercalation of lithium may be used. For example, the negative electrode active material may contain one or more selected from Si, $SiO_x$ (0<x<2), Si/C, SiO/C, Si-Metal, and the like. In this case, $SiO_x$ (0<x<2) may also contain lithium (Li). For example, the negative electrode active material may contain one or more selected from $Li_2SiO_3$, $Li_2Si_2O_5$, $Li_4SiO_4$, $Li_4Si_3O_8$, and the like. In addition, the Si-Metal metal may contain, for example, one or more selected from Al, Cu, Ti, Fe, Zn, Ni, and the like.

In an embodiment of the present invention, a content of silicon with respect to 100 wt % of the total negative electrode active material in the negative electrode active material slurry may be 2.5 wt % or more, preferably 5 wt % or more, and more preferably 10 wt % or more.

More specifically, the negative electrode binder and the conductive material will be described.

The negative electrode binder may serve to allow the negative electrode active material to be bound to the negative electrode current collector portion well so that negative electrode active material particles are bound to each other well. As the negative electrode binder, a water-insoluble binder, a water-soluble binder, or a combination thereof may be used.

The water-insoluble binder may be, for example, any one selected from polyvinyl chloride, carboxylated polyvinyl chloride, polyvinyl fluoride, a polymer containing ethylene oxide, polyvinyl pyrrolidone, polyurethane, polytetrafluoroethylene, polyvinylidene fluoride, polyethylene, polypropylene, polyamide imide, polyimide, or combinations thereof. However, the water-insoluble binder is not limited thereto.

In addition, the water-soluble binder may be any one selected from styrene-butadiene rubber, acrylated styrene-butadiene rubber, polyvinyl alcohol, sodium polyacrylate, a copolymer of propylene and olefin having 2 to 8 carbon atoms, polyacrylamide, a copolymer of (meth)acrylic acid and (meth)acrylic acid alkyl ester, or combinations thereof. However, the water-soluble binder is not limited thereto.

In a case where the water-soluble binder is used as the negative electrode binder, the negative electrode active material slurry may further contain a cellulose-based compound capable of imparting viscosity. The cellulose-based compound is not particularly limited, but may be a mixture of one or more of carboxymethyl cellulose, hydroxypropylmethyl cellulose, methyl cellulose, or alkali metal salts thereof. As an alkali metal, Na, K, or Li may be used.

The conductive material may serve to impart conductivity to the electrode. As the conductive material, any electrically conductive material that does not cause a chemical change in the lithium secondary battery may be used. For example, a conductive material containing carbon-based materials such as natural graphite, artificial graphite, carbon black, acetylene black, ketjen black, carbon fiber, and carbon nanotube; metal-based materials such as metal powders or metal fibers of copper, nickel, aluminum, silver, and the like; conductive polymers such as polyphenylene derivatives; or mixtures thereof may be used.

In the present invention, the removing of the masking is not particularly limited, and various removal methods may be employed according to an adopted masking method.

The method of manufacturing a lithium secondary battery according to the present invention has been described in detail hereinabove. This corresponds to an example for manufacturing the lithium secondary battery according to the present invention by a simpler process, and thus, the lithium secondary battery may be manufactured by a method different from that described above.

That is, in the present invention, there may be various methods of forming the uncoated portion on the negative electrode current collector portion. For example, there may be a method of coating the negative electrode active material on portions other than the uncoated portion in a design, and on the contrary, there may be a method of first coating the negative electrode active material as a whole and then directly removing the negative electrode active material to form the uncoated portion.

For example, in the present invention, the preparing of the negative electrode may include forming a negative electrode active material layer on the negative electrode current collector portion; and directly removing the negative electrode active material layer at a point adjacent to an extension line of a boundary line between the negative electrode current collector portion and the negative electrode tab portion when the negative electrode is viewed from above, unlike described above. In this case, as a method of directly removing the negative electrode active material layer, either a physical method or a chemical method may be employed.

A lithium secondary battery according to the present invention will be described in more detail. The lithium secondary battery according to the present invention may further include components that may be employed in a general lithium secondary battery, together with the negative electrode of the present invention described above. For example, the lithium secondary battery according to the present invention may further include a positive electrode, an electrolyte, and a separator.

The positive electrode may include a positive electrode current collector and a positive electrode active material layer disposed on the positive electrode current collector.

A material of the positive electrode current collector may be Al or Cu, but is not limited thereto.

As the positive electrode active material, a compound capable of reversible intercalation and deintercalation of lithium may be used. Specifically, the positive electrode active material may be a lithium metal oxide, and be one or more of composite oxides of a metal selected from cobalt, manganese, nickel, and combinations thereof and lithium, and is not particularly limited to a specific composition.

In addition, the positive electrode active material layer may further contain a binder and a conductive material.

The positive electrode binder may serve to allow the positive electrode active material to be bound to a positive electrode current collector portion well so that positive electrode active material particles are bound to each other well. As the positive electrode binder, for example, any one or two or more selected from the group consisting of polyvinyl alcohol, carboxymethyl cellulose, hydroxypropyl cellulose, diacetyl cellulose, polyvinyl chloride, carboxylated polyvinyl chloride, polyvinyl fluoride, a polymer containing ethylene oxide, polyvinyl pyrrolidone, polyurethane, polytetrafluoroethylene, polyvinylidene fluoride, polyethylene, polypropylene, styrene-butadiene rubber, acrylated styrene-butadiene rubber, an epoxy resin, and nylon may be used.

The conductive material may serve to impart conductivity to the electrode. As the conductive material, any electrically conductive material that does not cause a chemical change in the lithium secondary battery may be used. As the conductive material, for example, natural graphite, artificial graphite, carbon black, acetylene black, ketjen black, carbon fiber, carbon nanotube, or metal powders or metal fibers of copper, nickel, aluminum, silver, and the like may be used or one or a mixture of two or more of conductive materials such as polyphenylene derivatives may be used, but the conductive material is not limited thereto.

Examples of the electrolyte may include organic liquid electrolytes, inorganic liquid electrolytes, solid polymer electrolytes, gel-type polymer electrolytes, solid inorganic electrolytes, and molten inorganic electrolytes that may be used at the time of manufacturing lithium secondary battery, but are not limited thereto.

Specifically, the electrolyte may include an organic solvent and a lithium salt.

The organic solvent is not particularly limited as long as it may serve as a medium through which ions involved in an electrochemical reaction of the lithium secondary battery may move. For example, ester solvents such as methyl acetate, ethyl acetate γ-butyrolactone and ε-caprolactone; ether solvents such as dibutyl ether or tetrahydrofuran; ketone solvents such as cyclohexanone; aromatic hydrocarbon solvents such as benzene and fluorobenzene; carbonate solvents such as dimethyl carbonate, diethyl carbonate, methylethyl carbonate, ethylmethyl carbonate, ethylene carbonate, and propylene carbonate; alcohol solvents such as ethyl alcohol and isopropyl alcohol; nitriles such as R—CN (R is a C2 to C20 linear, branched or cyclic hydrocarbon group and may include a double bond aromatic ring or an ether bond); amides such as dimethyl formamide; dioxolanes such as 1,3-dioxolane; sulfolanes, or the like, may be used. However, the organic solvent is not limited thereto.

As the separator, for example, a multilayer separator of two or more layers formed of polyethylene, polypropylene, and polyvinylidene fluoride may be used or a mixed multilayer separator such as a separator of two-layer polyethylene/polypropylene, a three-layer separator of polyethylene/polypropylene/polyethylene, or a polypropylene/polyethylene/polypropylene three-layer separator may be used.

Hereinafter, Examples and Comparative Examples are described. However, Examples are only exemplary embodiments of the present invention, and the present invention is not limited to Examples.

[Evaluation Method]

(1) Evaluation of Life Characteristics of Battery

A capacity of a battery was confirmed within the range of 2.5 V to 4.2 V, and life characteristics of the battery were then evaluated between 10% and 100% of a state of charge (SOC). A constant current (CC) of 1 C rate was applied to the battery until a voltage of the battery reached 4.2 V (vs. Li/Li+) at 25° C., and the battery was then charged with a constant voltage (CV) until a charge current reached 0.1 C rate. Thereafter, the battery was discharged at a constant current (CC) of 1 C rate up to a voltage (less than about 3 V) corresponding to 10% of the SOC. Such a charge/discharge cycle was repeatedly performed 600 to 1800 times.

(2) Evaluation of Degradation of Negative Electrode

The battery was disassembled at 100% of the SOC of a twentieth charge/discharge cycle, and a degree of degradation of a negative electrode of the battery was then confirmed. In each battery, a pouch sealing portion was cut to separate an upper tab and an electrode portion, a positive electrode and a separator were removed, and drying and comparison were then performed.

Example 1

<Manufacture of Negative Electrode>

A negative electrode active material in which SiOx (0<x<2 and average particle diameter ($D_{50}$): 5 to 10 μm) and artificial graphite (average particle diameter ($D_{50}$): 10 to 15 μm) are mixed with each other in a weight ratio of 2:8, a binder in which styrene-butadiene rubber and carboxymethyl cellulose are mixed with each other in a weight ratio of 2:3, and a carbon nanotube (CNT) dispersion conductive material were prepared. A content of Si in the negative electrode active material was 11.4 wt %.

The prepared negative electrode active material, binder, and conductive material were mixed with each other in a weight ratio of 94:5:1, and were then dispersed in water to prepare a negative electrode active material slurry.

A copper thin film (width: 200 mm, length: 100 mm, and thickness: 10 μm except for a protrusion portion) of which an edge protrudes was taped and masked in a shape as illustrated in FIG. 1A using a casting polypropylene (CCP) tape (available from Tapex Co., Ltd and Width: 2 mm and thickness: 50 μm).

The negative electrode active material slurry was coated on the masked copper thin film, dried in a hot air dryer (oven) at 80° C. for 2 hours, and rolling was then performed. Thereafter, the tape and the negative electrode active material on the tape were lifted and removed together, rolling was performed, and drying was then additionally performed in a vacuum oven at 110° C. for 12 hours to prepare a negative electrode coated with a negative electrode active material having a shape as illustrated in FIG. 2A.

In FIG. 1A, a gray portion refers to a taped portion, and in FIG. 2A, a gray portion refers to a portion coated with the negative electrode active material.

<Manufacture of Positive Electrode>

In order to manufacture a cell having a capacity of about 20 Ah, $LiNi_{0.8}Co_{0.1}Mn_{0.1}O_2$ (average particle diameter ($D_{50}$): 12 μm) was used, Denka Black and flake-shaped graphite-based KS6 were used as a conductive material, and polyvinylidene fluoride (PVDF) was used as a binder.

These materials were mixed with each other in a weight ratio of 96.5:1:1:1.5 to prepare a positive electrode active material slurry, the prepared positive electrode active material slurry was coated and dried on an aluminum substrate (thickness: 12 μm), and rolling was then performed to prepare a positive electrode.

<Manufacture of Lithium Secondary Battery>

A separator (polyethylene and thickness: 13 μm) was interposed between the manufactured negative electrode and positive electrode to manufacture an electrode assembly. Next, the electrode assembly was put in a pouch, and an electrolyte was injected to manufacture a lithium secondary battery.

As the electrolyte, an electrolyte obtained by preparing a 1M $LiPF_6$ solution using a mixed solvent of EC/EMC/DEC (volume ratio 25:45:30) and then adding 5 parts by weight of fluoroethylene carbonate (FEC) to 100 parts by weight of the $LiPF_6$ solution was used.

The manufactured lithium secondary battery was evaluated according to the above evaluation method.

Example 2

The same processes as in Example 1 were performed except that a negative electrode coated with a negative electrode active material having a shape of FIG. 2B was manufactured by taping the copper thin film in a shape of FIG. 1B.

The manufactured lithium secondary battery was evaluated according to the above evaluation method.

Example 3

The same processes as in Example 1 were performed except that a negative electrode coated with a negative electrode active material having a shape of FIG. 2C was manufactured by taping the copper thin film in a shape of FIG. 1C.

The manufactured lithium secondary battery was evaluated according to the above evaluation method.

Example 4

The same processes as in Example 1 were performed except that a negative electrode coated with a negative electrode active material having a shape of FIG. 2D was manufactured by taping the copper thin film in a shape of FIG. 1D.

The manufactured lithium secondary battery was evaluated according to the above evaluation method.

Examples 5 to 8

In Examples 5 to 8, the same processes as in Examples 1 to 4 were performed, respectively, but a negative electrode active material in which SiOx and artificial graphite were mixed with each other in a weight ratio of 1:9 was used. A content of Si in the negative electrode active material was 5.7 wt %.

The manufactured lithium secondary battery was evaluated according to the above evaluation method.

Examples 9 to 12

In Examples 9 to 12, the same processes as in Examples 1 to 4 were performed, respectively, but a negative electrode active material in which SiOx and artificial graphite were mixed with each other in a weight ratio of 0.5:9.5 was used. A content of Si in the negative electrode active material was 2.9 wt %.

The manufactured lithium secondary battery was evaluated according to the above evaluation method.

Comparative Example 1

The same processes as in Example 1 were performed except that a negative electrode coated with a negative electrode active material having a shape of FIG. 2E was manufactured by taping the copper thin film in a shape of FIG. 1E.

The manufactured lithium secondary battery was evaluated according to the above evaluation method.

Comparative Example 2

The same processes as in Comparative Example 1 were performed, but a negative electrode active material in which SiOx and artificial graphite were mixed with each other in a weight ratio of 1:9 was used. A content of Si in the negative electrode active material was 5.7 wt %.

The manufactured lithium secondary battery was evaluated according to the above evaluation method.

Comparative Example 3

The same processes as in Comparative Example 1 were performed, but a negative electrode active material in which SiOx and artificial graphite were mixed with each other in a weight ratio of 0.5:9.5 was used. A content of Si in the negative electrode active material was 2.9 wt %.

The manufactured lithium secondary battery was evaluated according to the above evaluation method.

[Experimental Example 1] Evaluation of Degradation of Negative Electrode

In order to confirm degrees of degradation of negative electrodes according to Examples 1 to 3 and Comparative Example 1, evaluation was performed according to the above evaluation method. Taken photographs of respective negative electrodes were illustrated in FIG. 3.

Referring to FIG. 3, it may be confirmed that, in Comparative Example 1, degradation such as denting significantly occurred on a surface of the negative electrode. This is considered to be due to volume expansion of the negative electrode active material at the time of charging and discharging the lithium secondary battery.

On the other hand, it may be confirmed that in Examples 1 to 3, surfaces of the negative electrodes were clean, such that degradation did not substantially occur. From this, it may be confirmed that the expansion stress of the negative electrode active material occurring at the time of charging and discharging the lithium secondary battery was effectively alleviated through the uncoated portion.

[Experimental Example 2] Evaluation of Life Characteristics of Secondary Battery Life characteristics of the lithium secondary batteries according to Examples 1 to 12 and Comparative Examples 1 to 3 were evaluated according to the above evaluation method. The numbers of charge/discharge cycles at a point in time showing a capacity retention rate of 80% and a point in time showing a capacity retention rate of 75% were illustrated in Table 1.

Figure 4:
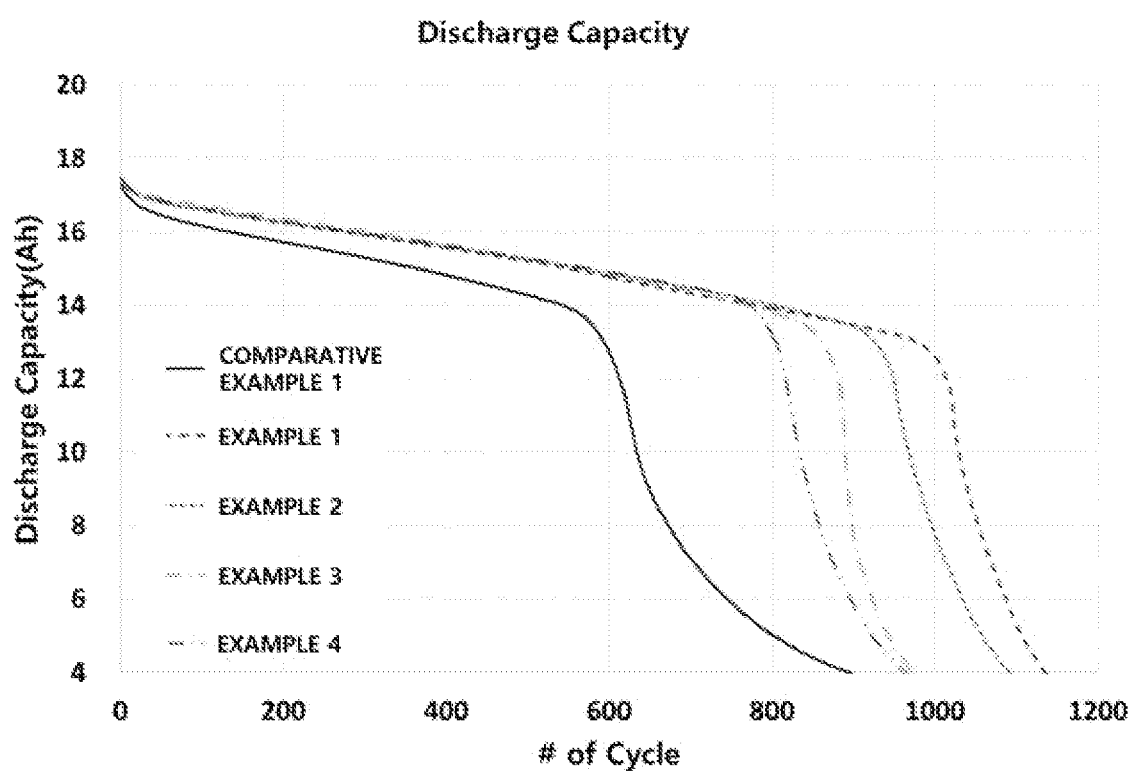
FIG. 4 is a graph illustrating discharge capacities according to the numbers of charge/discharge cycles of lithium secondary batteries according to Examples 1 to 4 and Comparative Example 1.
Figure 5:
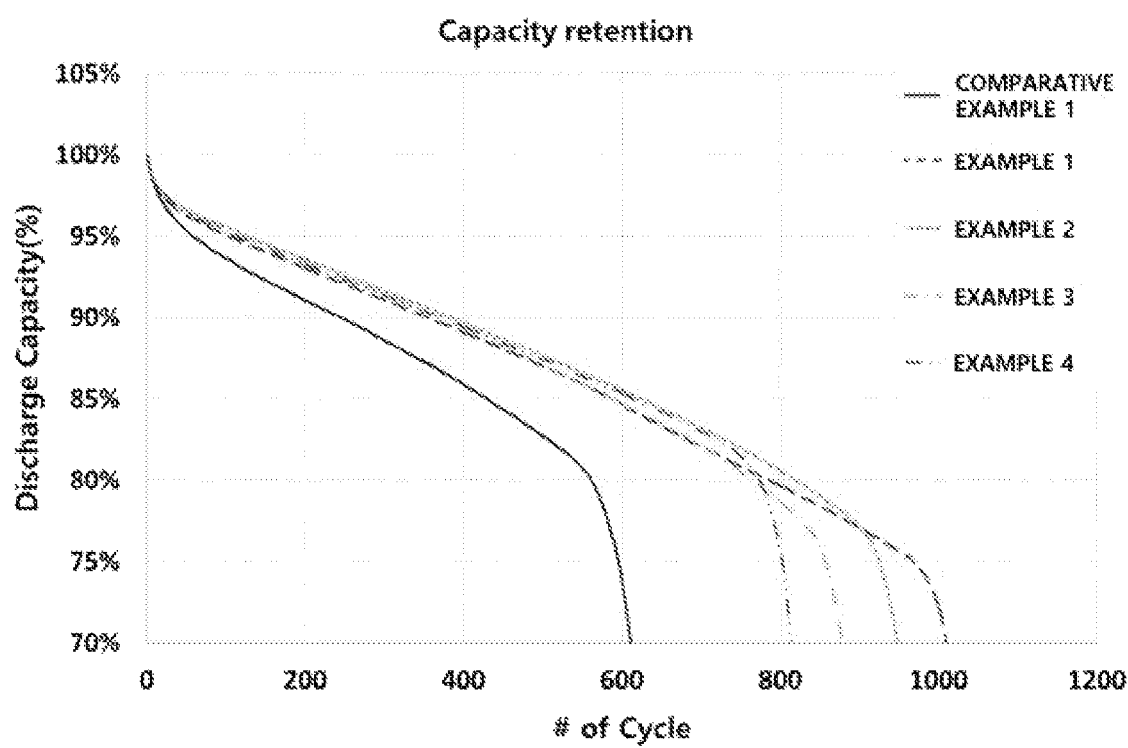
FIG. 5 is a graph illustrating capacity retention rates according to the numbers of charge/discharge cycles of the lithium secondary batteries according to Examples 1 to 4 and Comparative Example 1.

In addition, graphs of discharge capacities according to the numbers of charge/discharge cycles according to Examples 1 to 4 and Comparative Example 1 were illustrated in FIG. 4, and graphs of capacity retention rates according to the numbers of charge/discharge cycles were illustrated in FIG. 5.

TABLE 1

| | Number of charge/discharge cycles at point in time showing capacity retention rate of 80% | Number of charge/discharge cycles at point in time showing capacity retention rate of 75% |
| --- | --- | --- |
| Example 1 | 787 | 970 |
| Example 2 | 820 | 926 |
| Example 3 | 765 | 858 |
| Example 4 | 774 | 803 |
| Comparative Example 1 | 562 | 596 |
| Example 5 | 1194 | 1381 |
| Example 6 | 1221 | 1336 |
| Example 7 | 1162 | 1271 |
| Example 8 | 1188 | 1260 |
| Comparative Example 2 | 874 | 921 |
| Example 9 | 1585 | 1777 |
| Example 10 | 1602 | 1728 |
| Example 11 | 1571 | 1694 |
| Example 12 | 1580 | 1709 |
| Comparative Example 3 | 1350 | 1401 |

Referring to Table 1, it may be confirmed that in a case of Examples, the numbers of charge/discharge cycles at the point in time showing the capacity retention rate of 80% and the point in time showing a capacity retention rate of 70% showed numeral values significantly higher than those of Comparative Examples. From this, it may be confirmed that Examples showed significantly improved lifespan characteristics by including the negative electrodes improved in protection against degradation.

Referring to FIG. 4, it may be confirmed that in Comparative Example 1, an initial discharge capacity was about 17 Ah, a discharge capacity showed about 13 Ah at a point in time of an about sixth-hundredth charge/discharge cycle, was then rapidly decreased, and showed 5 Ah at a point in time of an about eight-hundredth charge/discharge cycle. In addition, referring to FIG. 5, it may be confirmed that in Comparative Example 1, a capacity retention rate is rapidly decreased in the latter half of about five-hundredth to sixth-hundredth charge/discharge cycles.

On the other hand, referring to FIG. 4, it may be confirmed that in Examples 1 to 4, initial discharge capacities were about 17 Ah, and discharge capacities showed about 15 Ah even at a point in time of an about sixth-hundredth charge/discharge cycle. In addition, it may be confirmed that discharge capacities showed about 14 Ah, which is excellent, even at a point in time of an about eight-hundredth charge/discharge cycle.

In addition, referring to FIG. 5, it may be confirmed that in Examples 1 to 4, rapid decreases in capacity retention rates did not appear up to the latter half of about nine-hundredth to thousandth charge/discharge cycles in Example 1, up to an about nine-hundredth charge/discharge cycle in Example 2, up to the latter half of about eighth-hundredth to nine-hundredth charge/discharge cycles in Example 3, and up to an about eight-hundredth charge/discharge cycle in Example 4.

In Examples 1 to 4, capacity retention rates showed about 80% or more even after the about eight-hundredth charge/discharge cycle, and in Examples 1 and 2, the capacity retention rate was excellent even after the about nine-hundredth charge/discharge cycle. In particular, in Example 1, the capacity retention rate was excellent even after an about thousandth charge/discharge cycle.

From trends of the discharge capacities and the capacity retention rates according to the numbers of charge/discharge cycles of Examples 1 to 4 and Comparative Example 1, it may be confirmed that Examples showed significantly improved lifespan characteristics by including the negative electrodes improved in protection against degradation.

The invention claimed is:

1. A lithium secondary battery comprising:
a negative electrode comprising a negative electrode current collector portion and a negative electrode tab portion protruding from a leftmost side of one surface of the negative electrode current collector portion,
wherein the negative electrode current collector portion comprises a coated portion that is coated with a negative electrode active material and an uncoated portion that is not coated with the negative electrode active material,
when the negative electrode is viewed from above, the uncoated portion is positioned at a point in contact with at least one end point of a boundary line between the negative electrode current collector portion and the negative electrode tab portion, wherein the uncoated portion comprises a longitudinal line having a width defined by a leftmost side and a rightmost side, wherein the leftmost side of the longitudinal line is positioned at a point in contact with a rightmost end point of the boundary line between the negative electrode current collector portion and the negative electrode tab portion.

2. The lithium secondary battery of claim 1, wherein the uncoated portion further comprises a transverse line starting from a side of the negative electrode current collector portion on which the negative electrode tab portion does not protrude and having a width.

3. The lithium secondary battery of claim 2, wherein the transverse line starts from a point of 30% or more and 70% or less of a total length of the side of the negative electrode current collector portion on which the negative electrode tab portion does not protrude.

4. The lithium secondary battery of claim 1, wherein the width of the longitudinal line is 0.1 to 10% of a total horizontal length of the negative electrode current collector portion.

5. The lithium secondary battery of claim 1, wherein the width of the longitudinal line is 0.2 mm or more and is 10% or less of a total horizontal length of the negative electrode current collector portion.

6. The lithium secondary battery of claim 1, wherein a content of silicon in the negative electrode active material is 5 wt % or more with respect to 100 wt % of the total negative electrode active material.

7. A method of manufacturing a lithium secondary battery, comprising:

preparing a negative electrode comprising a negative electrode current collector portion partially coated with a negative electrode active material and a negative electrode tab portion protruding from a leftmost side of one surface of the negative electrode current collector portion, wherein the preparing of the negative electrode comprises:

masking a point in contact with at least one end point of a boundary line between the negative electrode current collector portion and the negative electrode tab portion when the negative electrode is viewed from above, wherein in the masking, the point is masked in a shape of a longitudinal line having a width defined by a leftmost side and a rightmost side, wherein the leftmost side of the longitudinal line is positioned at a point in contact with a rightmost end point of the boundary line between the negative electrode current collector portion and the negative electrode tab portion;

coating and drying a negative electrode active material slurry on the negative electrode current collector portion; and removing the masking.

8. The method of manufacturing a lithium secondary battery of claim 7, wherein in the masking, a transverse line is further masked starting from a side of the negative electrode current collector portion on which the negative electrode tab portion does not protrude and having a width.

9. The method of manufacturing a lithium secondary battery of claim 8, wherein the transverse line is masked to be positioned at a point of 30% or more and 70% or less of a total length of the side of the negative electrode current collector portion on which the negative electrode tab portion does not protrude.

10. The method of manufacturing a lithium secondary battery of claim 7, wherein in the masking, the width of the longitudinal line is 0.1 to 10% of a total horizontal length of the negative electrode current collector portion.

11. The method of manufacturing a lithium secondary battery of claim 7, wherein in the masking, the width of the longitudinal line is 0.2 mm or more and is 10% or less of a total horizontal length of the negative electrode current collector portion.

12. The method of manufacturing a lithium secondary battery of claim 7, wherein in the masking, the point is masked using a heat-shrinkable tape.

13. The method of manufacturing a lithium secondary battery of claim 7, wherein in the coating and drying of the negative electrode active material slurry, a content of silicon with respect to 100 wt % of the total negative electrode active material in the negative electrode active material slurry is 5 wt %.

14. The lithium secondary battery of claim 2, wherein the width of the transverse line is 0.1 to 10% of a total vertical length of the negative electrode current collector portion.

15. The lithium secondary battery of claim 2, wherein the width of the transverse line is 0.2 mm or more and is 10% or less of a total vertical length of the negative electrode current collector portion.

16. The method of manufacturing a lithium secondary battery of claim 8, wherein in the masking, the width of the transverse line is 0.1 to 10% of a total vertical length of the negative electrode current collector portion.

17. The method of manufacturing a lithium secondary battery of claim 8, wherein in the masking, the width of the transverse line is 0.2 mm or more and is 10% or less of a total vertical length of the negative electrode current collector portion.

* * * * *